March 13, 1945.  A. RICKENBACHER  2,371,410
HEATING DEVICE
Filed Dec. 9, 1939
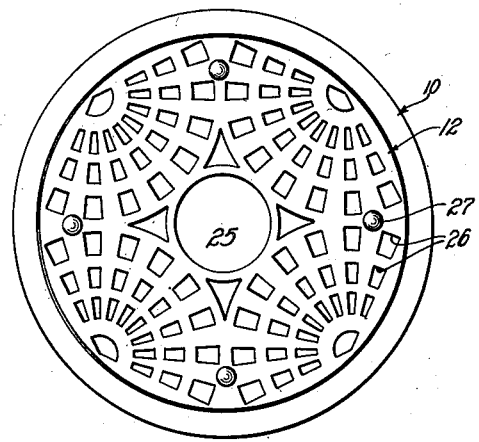
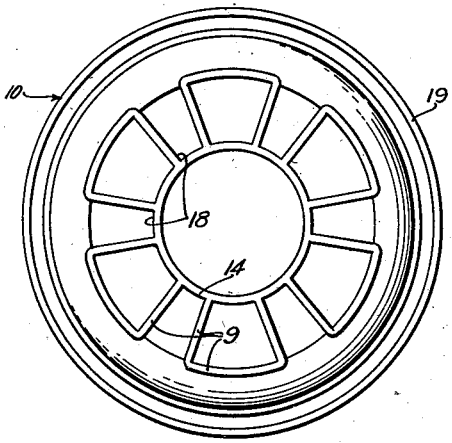
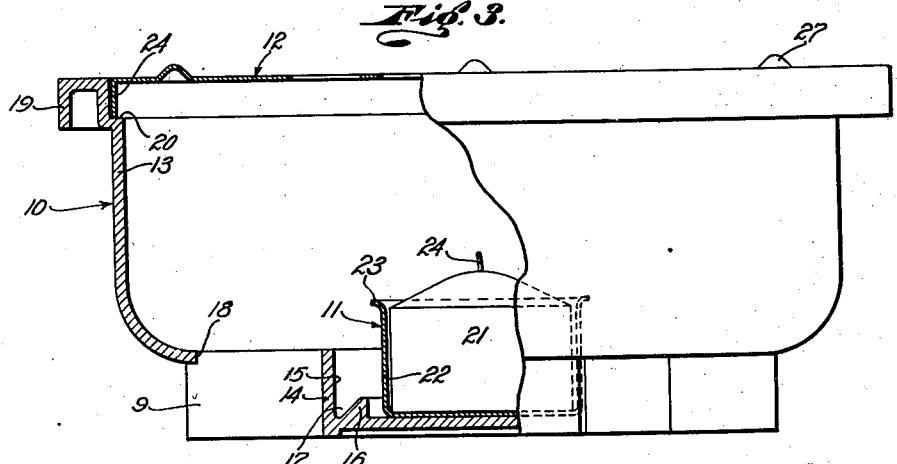
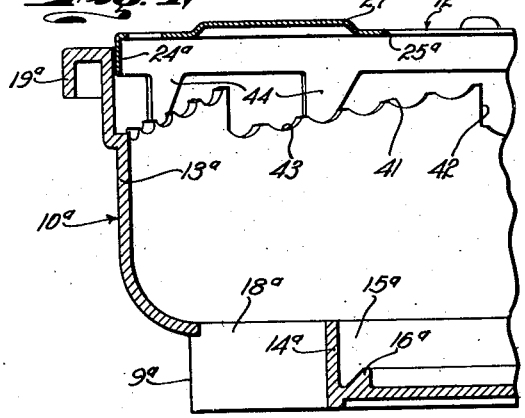
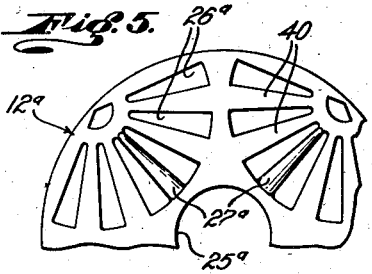
Inventor
ADOLPH RICKENBACHER
By
His Attorney Patented Mar. 13, 1945

2,371,410

UNITED STATES PATENT OFFICE 2,371,410

HEATING DEVICE

Adolph Rickenbacher, Los Angeles, Calif.

Application December 9, 1939, Serial No. 308,405

3 Claims. (Cl. 126—261)

This invention relates to heating devices and relates more particularly to stoves or heating devices for maintaining foods, beverages, etc., at the correct or selected temperature for serving. A general object of this invention is to provide a simple, practical and effective device for maintaining foods, beverages, etc., at a uniform and selected temperature for serving.

Another object of this invention is to provide a device of the character mentioned that is small, compact, light in weight and pleasing in appearance and, therefore, adapted to be placed on the table, sideboard, or the like, to maintain the food or beverage at a uniform temperature for serving.

Another object of this invention is to provide a device of the character mentioned that operates without producing smoke or odors and without soiling the utensils.

Another object of this invention is to provide a device of the character mentioned that is safe and economical to use. The device of the invention may employ a simple paraffin candle, or the like, as the heat producing means and the candle cannot explode and burns for a long period.

Another object of this invention is to provide a device of the character mentioned that is regulable or adjustable to vary the distance between the flame and the bottom of the pan or utensil thus obtaining the maximum efficiency in operation with the candle at any length, and providing for a range or variation in the temperature at which the food is to be maintained.

Another object of this invention is to provide a device of the character mentioned that embodies a novel means for assuring a correct and ample draft or circulation so that the flame burns evenly and without producing soot, smoke, or odors.

A further object of this invention is to provide a device of the character mentioned that embodies a minimum number of parts and is simple to manufacture.

The various objects and features of my invention will be fully understood from the following detailed description of typical preferred forms and applications of the invention, throughout which description reference is made to the accompanying drawing, in which:

Fig. 1 is a plan view of one embodiment of the invention. Fig. 2 is a bottom view of the device shown in Fig. 1. Fig. 3 is an enlarged side elevation of the device illustrated in Fig. 1 with a portion broken away to appear in vertical cross section. Fig. 4 is a fragmentary vertical detailed sectional view of another form of the invention and Fig. 5 is a reduced fragmentary plan view of the device illustrated in Fig. 4.

The device of the invention illustrated in Figs. 1, 2 and 3 may be said to comprise, generally, a body 10, a heating element or heating means 11 in the body 10, and a grill or plate 12 on the body 10 for supporting pans and other receptacles.

The body 10 houses the heating means 11 and forms the combustion chamber or heating chamber of the device. In accordance with the invention the body 10 may be pleasing or ornamental in appearance. In the construction illustrated the body 10 is a bowl shaped member having a generally cylindrical side wall 13 open at its upper end and curved inwardly at its lower end to merge with a base. The base of the body 10 includes a central part 14 and a plurality of circumferentially spaced wings 9 radiating from the central part 14. The wings 9 are preferably chambered or hollow, being open at their under sides. The bottom wall of the body 10 has a central depression or socket 15 extending downwardly into the central base part 14. The socket 15 is provided to receive the heating means 11 and has a flat horizontal bottom wall. An upstanding annular wall 16 projects from the bottom of the socket 15 in spaced relation to the side wall of the socket to leave or define a groove 17. The bottom wall of the body 10 is cut away between wings 9 to have a plurality of circumferentially spaced apertures 18. The apertures 18 serve to admit air into the body 10 so that there may be an updraft through the body when the device is in use. It is to be noted that the wings 9 and the base part 14 support the body 10 on a table, or the like, so that the apertures 18 are spaced above the table and the wings and base part are arranged so that the apertures 18 cannot be obstructed. The upper edge of the body wall 13 may be finished with an outwardly projecting annular flange 19. As illustrated in Fig. 2 the flange 19 may be chambered or relieved at its under side to reduce the weight and cost. The upper surface of the flange 19 is preferably flat and generally horizontal. The side wall 13 of the body 10 is provided with an internal upwardly facing annular shoulder 20. The shoulder 20 is provided to support the plate 12 and is in spaced adjacent relation to the upper edge of the body. The body 10 just described may be an integral or one-piece casting of Bakelite, or other readily moldable material.

The heating means 11 is removably positioned in the body 10 and when in use serves to heat the pan or receptacle supported by the plate 12. In the preferred form of the invention the heating means 11 includes a candle 21 and a holder 22 for the candle. The candle 21 is preferably a good grade paraffin candle of rather large diameter and short in length. The holder 22 is a cup-like member containing or holding the candle 21. The holder 22 is proportioned to be freely received in the body socket 15 and seats within the wall 16. As illustrated, the holder 22 has some clearance with the wall 16. The wall 16 serves to hold the candle holder 22 substantially centralized so that the heated holder cannot contact the wall of the socket 15. An outwardly curved lip 23 is formed on the upper end of the holder 22. The holder 22 forms a cup or container for the melted paraffin or candle material to greatly prolong the life of the candle. The lip 23 may serve to direct liquid candle material outwardly from the holder 22 in the event the device is tipped or moved when in use, so that the liquid material is received in the groove 17. The groove 17 is adapted to trap or retain the wax or candle material so that this material does not interfere with the easy removal of the holder 22 from the body 10. The candle 21 supported in the centralized holder 22 has its wick 24 in or adjacent the central vertical axis of the body 10.

The plate 12 forms a grill or support for the food and beverage pans or receptacles. The plate 12 is a generally flat disc-shaped member of metal or other non-inflammable heat resisting material. The supporting plate 12 may be suitably finished, for example, it may be plated. In accordance with the invention the plate 12 is removably positioned to extend across the upper side of the bowl-like body 10. A downwardly projecting annular flange 24 is provided at the periphery of the disc-like plate 12. The flange 24 is preferably an integral part of the plate 12 and is freely received in the body 10 to have its lower edge rest on the shoulder 20. The parts are proportioned so that the upper surface of the plate 12 is substantially flush with or in the same plane as the top surface of the body flange 19 when the plate is in position on the body 10.

The supporting plate 12 is perforated to allow the heat from the means 11 to directly act on the utensils or containers and to allow for a desirable circulation of air through the body 10. In the preferred arrangement the plate 12 has a central opening 25 of substantial diameter directly over the flame of the candle 21 so that the heat of the flame acts directly on the bottom of the pan or receptacle. The remaining portion of the plate 12 is preferably perforated. As illustrated in Fig. 1, the major portion of the plate 12 has a plurality of perforations 26 shaped and arranged to form a pattern or design. The perforations 26 assist in allowing the heat from the means 11 to act directly on the bottom of the container or pan but are primarily provided to assure a sufficient circulation of air through the body 10 to assure the proper operation or burning of the candle 21.

The invention includes simple, yet effective means for supporting pans, receptacles, etc., on the plate 12 in such a manner that they do not close the perforations 26 against the passage or circulation of air. An annular series of circumferentially spaced raised parts 27 is provided on the plate 12. The parts 27 may be formed by pressing the metal of the plate 12 upwardly. The parts 27 are preferably equally spaced about the vertical center of the plate 12 and are preferably located between the corresponding elements or perforations 26 of the pattern formed in the plate. The crowns or tops of the parts 27 are suitably rounded for engagement by the bottoms of the pans or receptacles. It will be seen that the parts 27 are operable to support a pan or receptacle so that the receptacle bottom is spaced above the plate 12 leaving an ample clearance space for the free circulation of air and for the effective distribution of the heat. It is preferred to space the parts 27 a substantial distance from the vertical center of the plate 12 to offer ample support for large utensils or receptacles. Smaller pans, etc., that are incapable of resting on the parts 27 may seat directly on the upper surface of the plate 12, but cover only the opening 27 and the innermost perforations 26, leaving the outer perforations 26 fully open for the free circulation of air.

In the use of the device illustrated in Figs. 1, 2 and 3 of the drawing the candle 21 is arranged in the holder 22 and the holder is placed in the socket 15 in the position illustrated. The wick 24 of the candle 21 is then lighted and the plate 12 is arranged in the position where its flange 24 rests on the shoulder 20. The pan or receptacle containing the food or beverage is then placed on the plate 12. The heat from the candle flame serves to maintain the contents of the receptacle at a uniform temperature. The apertures 18 in the lower wall of the body 10 admit ample air into the body 10 to fully support the combustion at the candle wick 24. The perforations 26 and the opening 25 provide for the free circulation of air through the plate 12 and provide for the even distribution of the heat across the bottom of the food receptacle. The parts 27 hold the bottom of the food receptacle spaced above the plate 12 so that the air and heat may freely circulate above the plate. The opening 25 and the perforations 26 allow the heat from the candle 21 to directly act on the bottom of the receptacle. The candle burning in the confined space provided by the body 10 gives sufficient heat to maintain the receptacle and its contents at the desired temperature. The candle material that melts while the candle is burning is retained by the holder 22 so that the candle has a long life. After use the plate 12 is removed and the flame of the candle 21 is extinguished. It is preferred to snuff out the candle flame. When the candle 21 has been burned away, after repeated use, a new or replacement candle may be inserted in the holder 22.

Figs. 4 and 5 of the drawing illustrate a form of the invention embodying means for adjusting the height of the plate 12ª and embodying an alternative form of means for supporting the utensils or receptacles on the plate 12ª.

The body 10ª of the device illustrated in Figs. 4 and 5 is similar, generally, to the body 10 having a main side wall 13ª, a central base part 14ª, hollow wings 9ª radiating from the part 14ª, apertures 18ª in the bottom wall, a central socket 15a having an upstanding annular wall 16ª on its bottom and a marginal top flange 19ª, all as described above. The plate 12ª is substantially the same as the plate 12, being a generally horizontal disc-shaped member of sheet metal, or other non-inflammable heat resisting material, plated or finished as desired. The plate 12ª has peripheral downwardly projecting flange 24ª. A central opening 25ª of substantial diameter occurs in the plate 12ª and the plate has a number of perforations 26a. The perforations 26a are provided to assure the even distribution of the heat and to provide for the circulation of air through the body 10a. It is preferred to arrange the perforations 26a in a pattern or ornamental arrangement. In the case illustrated the perforations 26a are arranged in groups, the perforations of the several groups radiating from a common point. The perforations 26a in each group are spaced to leave imperforate strips 40. One or more of the strips 40 of each group of perforations 26a is raised to form receptacle supporting parts 27a. The parts 27a serve to support the pans or receptacles so that their bottoms are above the plate 12a leaving a space for the free distribution of the heat and the free circulation of the air. The parts 27a located as just described constitute elements of the pattern or design formed in the plate 12a.

The means for regulating or adjusting the height of the plate 12a comprises an annular series of cam surfaces 41 on the interior of the body wall 10a. The surfaces 41 form parts of an upwardly facing annular shoulder corresponding generally in location to the shoulder 20. The surfaces 41 slope in the same direction and at the same inclination and the high ends of the surfaces terminate at abrupt vertical shoulders 42. It is preferred to provide a series of spaced notches 43 in each cam surface 41. The notches 43 are preferably equally spaced and have rounded or curved walls.

The means for adjusting the plate 12a further includes legs or lugs 44 projecting downwardly from the flange 24a and cooperating with the surfaces 41. There is a lug 44 for cooperating with each cam surface 41. The lower ends of the legs 44 are rounded and shaped to fit the notches 43. The lugs 44 are circumferentially spaced in such a manner that they cooperate with the corresponding notches 43 of the several surfaces 41. With the lugs 44 in cooperation with the notches 43 the plate 12a is held in the selected adjusted position and the lugs cannot slide down the cam surfaces 41.

The use or operation of the device illustrated in Figs. 4 and 5 is substantially the same as in the previously described form of the invention. The holder 22 carrying a suitable candle 21 may be arranged in the socket 15a within the wall 16a. The candle wick 24 is then ignited and the plate 12a is arranged in place. The plate 12a may be adjusted to the desired height by turning it so that the lugs 44 move along the cam surfaces 41. By turning the plate 12a in one direction the lugs 44 move down the surfaces 41 so that the plate is lowered, and by turning the plate in the other direction the lugs move up the inclined surfaces. The lugs 44 engage in the notches 43 with the plate 12a adjusted to the desired height to retain the plate in the adjusted position. The plate 12a may be adjusted vertically as just described, to compensate for variations in the heat generated by the candle 21 and for variations in the height of the candle or, if desired, the plate 12a may be adjusted vertically to maintain the food or beverage at a selected temperature. The pan or receptacle holding the food or beverages is placed on the plate 12a and in most instances rests on the parts 27a. Air is free to circulate up through the apertures 18a into the body 10a and out through the opening 25a and the perforations 26a. The clearance space between the plate 12a and the bottom of the receptacle provided by the parts 27a allows the air and heat to circulate upwardly from the body 10a.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A heating device of the character described comprising a body including an upstanding side wall, and a base at the lower end of the side wall, circumferentially spaced generally vertical wings on the base whose lower edges are adapted to rest on a support to mount the device and to hold the base above the support, there being substantially vertical air admitting apertures in the base between said wings, and a substantially central upwardly facing socket in the base distinct from said apertures, a holder removably received in the socket, flame generating means in the holder, and a perforated plate removably carried by the side wall to extend across the top of the body and adapted to support receptacles to be heated.

2. A heating device of the character described comprising a body including an upstanding side wall, and a base at the lower end of the side wall, radiating circumferentially spaced wings on the under side of the base whose lower edges are adapted to rest on a support to hold the base above the support, there being an annular series of substantially vertical air admitting apertures in the base between said wings, and a substantially central upwardly facing socket in the base within said series of openings, a holder removably received in the socket, flame generating means in the holder, an annular upstanding wall in the bottom of the socket within said series of apertures for centering said means and defining a groove for receiving material from said means, and a perforated plate removably carried by the side wall to extend across the top of the body and adapted to support receptacles to be heated.

3. A heating device of the character described comprising a body having a generally upstanding side wall, and a lower wall, the lower wall having a central socket, supporting legs radiating from the socket and adapted to support the body where its lower wall is above the supporting surfaces, there being air admitting openings in the lower wall between the legs, the socket being distinct from the apertures, a candle holder in the socket, and a perforated plate extending across the top of the body.

ADOLPH RICKENBACHER.